(12) United States Patent
Endo

(10) Patent No.: US 11,098,637 B2
(45) Date of Patent: Aug. 24, 2021

(54) THERMOSTAT AND COOLANT PASSAGE STRUCTURE

(71) Applicant: TOYOTA JIDOSHA KABUSHIKI KAISHA, Toyota (JP)

(72) Inventor: Yoshiki Endo, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 22 days.

(21) Appl. No.: 16/580,278

(22) Filed: Sep. 24, 2019

(65) Prior Publication Data

US 2020/0123962 A1 Apr. 23, 2020

(30) Foreign Application Priority Data

Oct. 19, 2018 (JP) .............................. JP2018-197377

(51) Int. Cl.
| | |
|---|---|
| *F01P 7/16* | (2006.01) |
| *F16K 24/02* | (2006.01) |
| *G05D 23/02* | (2006.01) |
| *F01P 7/14* | (2006.01) |

(52) U.S. Cl.
CPC ............... *F01P 7/16* (2013.01); *F16K 24/02* (2013.01); *F01P 2007/146* (2013.01); *G05D 23/024* (2013.01)

(58) Field of Classification Search
CPC .............. F01P 11/0285; F01P 2003/021; F01P 2007/146; F01P 3/02; F01P 7/16; F16K 24/02; F16K 31/002; G05D 23/024; G05D 23/1333
USPC ........... 236/40, 91 R, 101 R, 101 C; 251/169
See application file for complete search history.

(56) References Cited

U.S. PATENT DOCUMENTS

| | | | | |
|---|---|---|---|---|
| 4,011,988 A | * | 3/1977 | Inagaki ..................... | F01P 7/16 236/34.5 |
| 4,872,476 A | * | 10/1989 | Pflum .................. | F01P 11/0285 137/513.5 |
| 5,289,803 A | * | 3/1994 | Matsushiro .......... | F01P 11/0285 123/41.1 |
| 5,647,810 A | * | 7/1997 | Huddleston ........... | F16C 13/006 192/105 CD |
| 5,749,515 A | * | 5/1998 | Duprez ................ | F01P 11/0285 236/34.5 |
| 5,993,179 A | * | 11/1999 | Baur ..................... | B60T 8/4031 417/554 |

(Continued)

FOREIGN PATENT DOCUMENTS

| | | | |
|---|---|---|---|
| JP | 2000136723 A | * | 5/2000 |
| JP | 2003-239743 | | 8/2003 |

*Primary Examiner* — George C Jin
*Assistant Examiner* — Teuta B Holbrook
(74) *Attorney, Agent, or Firm* — Finnegan, Henderson, Farabow, Garrett & Dunner, LLP

(57) ABSTRACT

A thermostat includes a valve member. The valve member has an insertion hole. The insertion hole is constituted by a first protective member and a second protective member. A shaft of a jiggle valve extends through the insertion hole. The jiggle valve has a substantially spherical head connected to an end of the shaft. The head closes the insertion hole by contacting the peripheral edge of the opening of the insertion hole. The materials of the first protective member and the second protective member each have a Vickers hardness higher than that of the valve member, which is part of the valve member other than the protective members.

5 Claims, 3 Drawing Sheets

(56) References Cited

U.S. PATENT DOCUMENTS

| | | | | |
|---|---|---|---|---|
| 2004/0163612 | A1* | 8/2004 | Takahashi | G05D 23/1333 |
| | | | | 123/41.1 |
| 2013/0312934 | A1* | 11/2013 | Yasui | G05D 23/025 |
| | | | | 165/96 |
| 2019/0186633 | A1* | 6/2019 | Ma | F16J 15/3236 |
| 2020/0011154 | A1* | 1/2020 | Stachowiak, Jr. | E21B 34/08 |

* cited by examiner

THERMOSTAT AND COOLANT PASSAGE STRUCTURE

BACKGROUND

1. Field

The present disclosure relates to a thermostat and a coolant passage structure.

2. Description of Related Art

Japanese Laid-Open Patent Publication No. 2003-239743 discloses a thermostat that is arranged in the middle of the coolant passage of an internal combustion engine. This thermostat includes a thermostat housing that constitutes a part of the coolant passage. The thermostat housing incorporates a valve member for opening and closing the flow path of the coolant passage. When the coolant temperature in the thermostat housing on the downstream side of the valve member is high, the valve member opens to allow coolant to flow from the upstream side of the thermostat (the radiator side) to the downstream side. The valve member has an insertion hole. The insertion hole receives a jiggle valve, which is capable of opening and closing the insertion hole.

A typical jiggle valve includes a shaft that extends through the insertion hole and a head coupled to one end of the shaft. The outer diameter of the head of the jiggle valve is greater than the diameter of the insertion hole. When the coolant pressure on the upstream side of the valve member in the thermostat is high, the head of the jiggle valve is pushed against the open edge of the insertion hole so that the insertion hole is closed by the jiggle valve.

In the above-described thermostat, however, when the coolant pressure on the upstream side of the valve member is not sufficiently high, the force by which the head of the jiggle valve is pushed against the open edge of the insertion hole is weak. In this case, the jiggle valve moves slightly to repeatedly collide with or slide on the open edge of the insertion hole. This may wear the open edge of the insertion hole of the valve member.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a thermostat provided in a middle of a coolant passage of a coolant circulation system employed in a vehicle is provided. The thermostat includes a thermostat housing, a valve member, and a jiggle valve. The thermostat housing constitutes a part of the coolant passage. The valve member is arranged inside the thermostat housing and selectively opens and closes a flow path inside the thermostat housing. The jiggle valve is attached to an insertion hole extending through the valve member. The jiggle valve includes a shaft that extends through the insertion hole and a head that is coupled to an upstream side of the shaft and is capable of closing the insertion hole. A part in an upstream surface of the valve member that includes an open edge of the insertion hole is constituted by a protective portion. The protective portion has a Vickers hardness that is higher than that of a section other than the part that includes the open edge of the insertion hole.

In another general aspect, a coolant passage structure is provided that includes a thermostat and an introduction passage. The thermostat is provided in a middle of a coolant passage of an internal combustion engine. The introduction passage is connected to a downstream end of the thermostat and constitutes a part of the coolant passage. The thermostat includes thermostat housing, a valve member, and a jiggle valve. The thermostat housing constitutes a part of the coolant passage. The valve member is arranged inside the thermostat housing and selectively opens and closes a flow path of the thermostat housing. The jiggle valve is attached to an insertion hole extending through the valve member. The jiggle valve includes a shaft that extends through the insertion hole, and a head that is coupled to an upstream side of the shaft and is capable of closing the insertion hole. A part in an upstream surface of the valve member that includes an open edge of the insertion hole is constituted by a protective portion. The protective portion has a Vickers hardness that is higher than that of a section other than the part that includes the open edge of the insertion hole. The introduction passage is connected to a water jacket of a cylinder block in the internal combustion engine. In a state in which the internal combustion engine is mounted on a vehicle, a space on an upstream side of the valve member in the thermostat housing is arranged above a space on a downstream side of the valve member with the valve member in between. An upper opening of the insertion hole is located above a section at which the introduction passage is connected to the water jacket of the cylinder block.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A coolant circulation system according to an embodiment will now be described with reference to the drawings. The coolant circulation system is employed in a vehicle having an internal combustion engine. First, the passage structure of the coolant circulation system will be described.

Figure 1:
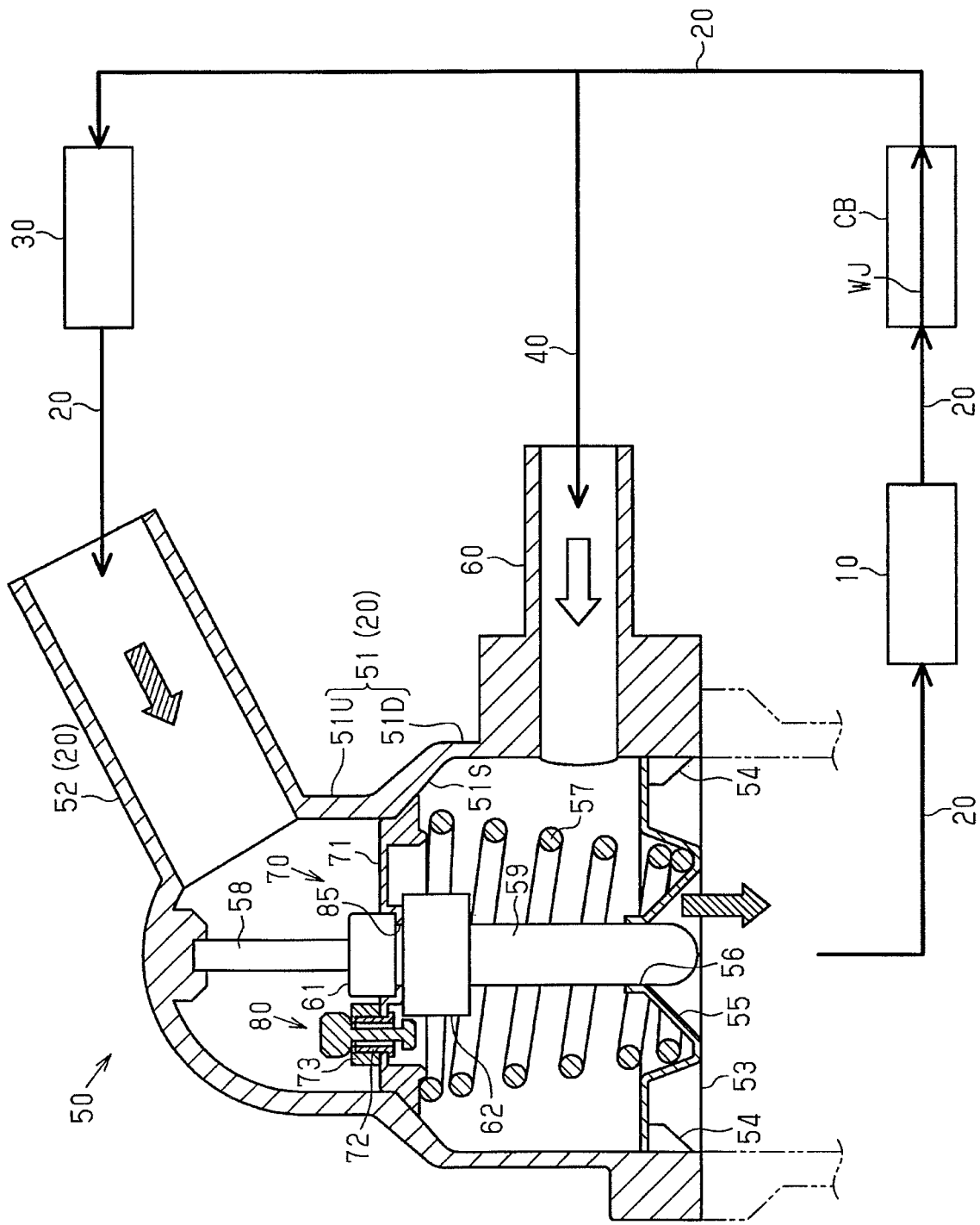
FIG. 1 is a schematic diagram of a coolant circulation system.

As shown in FIG. 1, the coolant circulation system includes an electric water pump 10. The water pump 10 is connected to a coolant passage 20. Coolant that is pressure-fed by the water pump 10 circulates to flow through the coolant passage 20 and then return to the water pump 10.

The water jacket WJ of the cylinder block CB of the internal combustion engine is arranged on the downstream side of the water pump 10 in the coolant passage 20. The water jacket WJ performs heat exchange between the cylinder block CB, which is warmed by combustion of fuel, and coolant flowing through the water jacket WJ.

A radiator 30, which cools the coolant, is arranged on the downstream side of the cylinder block CB in the coolant passage 20. The radiator 30 performs heat exchange between the outside air drawn into the engine compartment of the vehicle and the warmed coolant flowing through the radiator 30.

The upstream end of a bypass passage 40 is connected to a section of the coolant passage 20 between the cylinder block CB and the radiator 30. The downstream end of the bypass passage 40 is connected to a section of the coolant passage 20 on the downstream side of the radiator 30. A thermostat 50 is arranged in a section of the coolant passage 20 that is connected to the bypass passage 40. The thermostat 50 selectively opens and closes the flow path of coolant in accordance with the temperature of the coolant.

The structure of the thermostat 50 will now be described. The thermostat 50 includes an annular first inflow pipe 52. The first inflow pipe 52 is connected to a section on the downstream side of the radiator 30 in the coolant passage 20.

The downstream end of the first inflow pipe 52 is connected to a thermostat housing 51. The thermostat housing 51 is generally tubular and has a first end connected to the first inflow pipe 52. The thermostat housing 51 includes an upstream portion 51U and a downstream portion 51D. The upstream portion 51U is arranged on the upstream side of the thermostat housing 51, that is, in the vicinity of the first inflow pipe 52. The downstream portion 51D is arranged on the downstream side of the upstream portion 51U in the thermostat housing 51. The inner diameter and the outer diameter of the downstream portion 51D are both greater than the inner diameter and the outer diameter of the upstream portion 51U. Accordingly, a step is formed on the inner wall surface of the thermostat housing 51 at the boundary between the upstream portion 51U and the downstream portion 51D.

A second end (the downstream portion 51D) of the thermostat housing 51 is connected to a section of the coolant passage 20 that is connected to the water pump 10. That is, the second end of the thermostat housing 51 is an outflow port 53, through which coolant flows out to the water pump 10. In the present embodiment, the first inflow pipe 52 and the thermostat housing 51 constitute a part of the coolant passage 20.

A second inflow pipe 60, to which the downstream end of the bypass passage 40 is connected, extends from the downstream portion 51D of the thermostat housing 51. The second inflow pipe 60 has a cylindrical shape. The second inflow pipe 60 is a connection portion at which the coolant passage 20 and the bypass passage 40 are connected to each other.

Stopper projections 54 (the number of which is four, for example) are provided in a section on the downstream side of the second inflow pipe 60 in the inner wall of the downstream portion 51D. The stopper projections 54 are provided at equal angular intervals in the circumferential direction about the axis of the thermostat housing 51.

A spring seat 55 is placed on the upstream surfaces of the stopper projections 54. The spring seat 55 has a shape of a disk as a whole and an outer diameter that is substantially the same as the inner diameter of the downstream portion 51D of the thermostat housing 51. The spring seat 55 has an attachment hole 56, which extends through the spring seat 55 in the thickness direction. The spring seat 55 has holes in addition to the attachment hole 56. These holes allow coolant to flow from the upstream side to the downstream side of the spring seat 55 in the thermostat housing 51.

A helical spring 57 is placed on the upstream surface of the spring seat 55. The helical spring 57 is arranged such that the central axis of the helical spring 57 is aligned with the central axis of the thermostat housing 51.

A valve member 70 includes a substantially disk-shaped valve main body 71 placed on the upstream end of the helical spring 57. The outer diameter of the valve main body 71 is greater than the inner diameter of the upstream portion 51U and is smaller than the inner diameter of the downstream portion 51D in the thermostat housing 51. The valve main body 71 has a connection hole 85 in the center. The connection hole 85 extends through the valve main body 71 in the thickness direction.

The helical spring 57 urges the valve main body 71 from the downstream side toward the upstream side of the thermostat housing 51. In a state in which the valve main body 71 is displaced toward the upstream side, the radially outer edge of the valve main body 71 contacts the step on the inner wall surface of the thermostat housing 51 at the boundary between the upstream portion 51U and the downstream portion 51D. That is, the step at the boundary between the upstream portion 51U and the downstream portion 51D is a valve seat 51S of the valve member 70.

When at the position contacting the valve seat 51S, the valve member 70 is in a closing state to block the flow of coolant from the first inflow pipe 52 to the outflow port 53. When at a position separated from the valve seat 51S, the valve member 70 is in an opening state to allow for flow of coolant from the first inflow pipe 52 to the outflow port 53.

An end of a rod-shaped guide bar 58 is fixed to the inner wall of the thermostat housing 51 on the upstream side. The guide bar 58 extends along the axis of the thermostat housing 51 toward the downstream side of the thermostat housing 51. The guide bar 58 extends through the connection hole 85 of the valve main body 71.

A temperature sensitive portion 59 is attached to the downstream side of the guide bar 58. The temperature sensitive portion 59 has the shape of a cylinder with a closed end. Part of the guide bar 58 is inserted into the temperature sensitive portion 59. The downstream end of the temperature sensitive portion 59 is inserted into the attachment hole 56 of the spring seat 55. The inner diameter of the temperature sensitive portion 59 is slightly greater than the outer diameter of the guide bar 58. The temperature sensitive portion 59 is movable in the axial direction relative to the guide bar 58.

A first flange 61 and a second flange 62 protrude from the outer circumferential surface of the temperature sensitive portion 59. The first flange 61 and the second flange 62 both extend over the entire circumference of the temperature sensitive portion 59. The first flange 61 is arranged at an end in the axial direction of the temperature sensitive portion 59, that is, at the upstream end. The second flange 62 is arranged on the downstream side of the first flange 61 in the thermostat housing 51. The second flange 62 is arranged with a small clearance between the second flange 62 and the first flange 61. The valve main body 71 is held between the second flange 62 and the first flange 61. Thus, as the temperature sensitive portion 59 moves relative to the guide bar 58, the valve member 70 also moves relative to the guide bar 58.

Although not illustrated, thermo-wax is sealed in the temperature sensitive portion 59. The thermo-wax in the temperature sensitive portion 59 is solidified to contract when the temperature of the coolant contacting the temperature sensitive portion 59 is low and is melted to expand when the coolant temperature is high. Changes in the volume of the thermo-wax change the length of the part of the guide bar 58 inserted in the temperature sensitive portion 59. Accordingly, the temperature sensitive portion 59 is displaced in the axial direction of the thermostat housing 51 together with the valve member 70. This selectively opens and closes the valve member 70 in the thermostat 50.

The structure of the valve member 70 will now be described.

Figure 2:
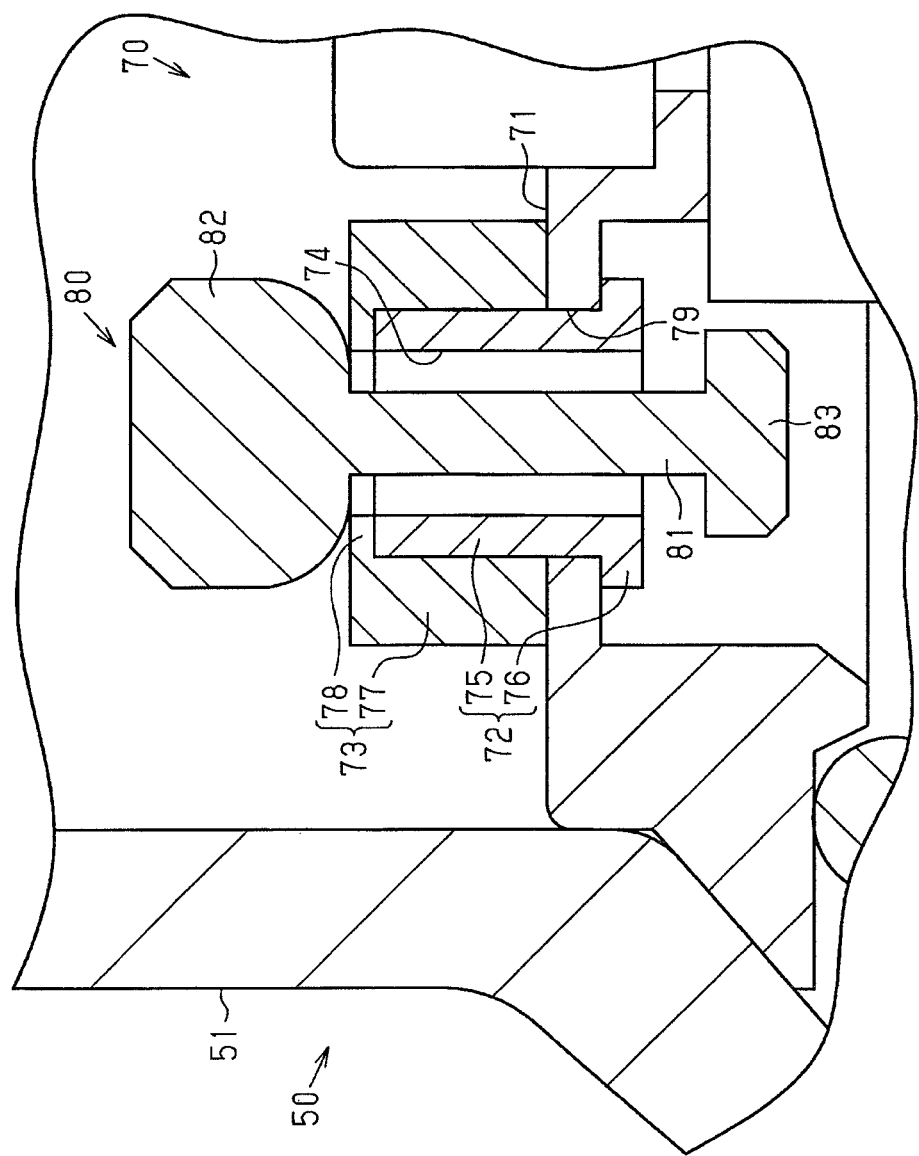
FIG. 2 is an enlarged view of the valve member and the jiggle valve.

As shown in FIGS. 1 and 2, the valve member 70 is constituted by the valve main body 71, a first protective member 72, and a second protective member 73.

The valve main body 71 has a through-hole 79 in the center. The through-hole 79 extends through the valve main body 71 in the thickness direction. An insertion portion 75 of the first protective member 72 extends through the through-hole 79. The insertion portion 75 is cylindrical. The outer diameter of the insertion portion 75 is substantially the same as the inner diameter of the through-hole 79. A first contact portion 76 protrudes from the outer circumferential surface of the insertion portion 75. The first contact portion 76 extends over the entire circumference of the insertion portion 75. The first contact portion 76 is arranged at the downstream end of the insertion portion 75. The outer diameter of the first contact portion 76 is greater than the inner diameter of the insertion hole 74. The upstream surface of the first contact portion 76 contacts the downstream surface of the valve main body 71.

The second protective member 73 is fixed to the insertion portion 75 of the first protective member 72. The second protective member 73 has a cylindrical crimp portion 77. The inner diameter of the crimp portion 77 is substantially the same as that of the outer circumferential surface of the insertion portion 75 of the first protective member 72. The insertion portion 75 of the first protective member 72 extends through the crimp portion 77. The crimp portion 77 is fixed to the insertion portion 75 by crimping. The downstream end face of the crimp portion 77 contacts the valve main body 71. A second contact portion 78 protrudes from the inner circumferential surface of the crimp portion 77. The second contact portion 78 extends over the entire circumference of the crimp portion 77. The second contact portion 78 is arranged at the upstream end of the crimp portion 77.

The inner diameter of the second contact portion 78 is the same as the inner diameter of the insertion portion 75 of the first protective member 72. The central hole of the second contact portion 78 and the central hole of the insertion portion 75 are combined to form the insertion hole 74.

The first protective member 72 and the second protective member 73 project upward as a whole with respect to the valve main body 71 of the valve member 70 and function as a protective portion. The insertion hole 74, which is defied by the first protective member 72 and the second protective member 73, connects a space on the upstream side of the valve member 70 and a space on the downstream side of the valve member 70 to each other in the thermostat housing 51.

A shaft 81 of a jiggle valve 80 extends through the insertion hole 74. The length in the axial direction of the shaft 81 is greater than the length in the axial direction of the insertion hole 74. The jiggle valve 80 has a substantially spherical head 82 connected to a first end of the shaft 81. The head 82 is able to close the insertion hole 74 by contacting the peripheral edge of the opening of the insertion hole 74. That is, when viewed in the axial direction of the insertion hole 74, the head 82 has a circular shape greater than the inner diameter of the second protective member 73, which constitutes the insertion hole 74.

The jiggle valve 80 has a substantially spherical retaining portion 83 at a second end of the shaft 81. When the jiggle valve 80 moves upstream, the retaining portion 83 contacts a part of the open edge of the insertion hole 74 to prevent the jiggle valve 80 from coming off toward the upstream side. When viewed in the axial direction of the insertion hole 74, the retaining portion 83 has a circular shape greater than the inner diameter of the first protective member 72, which constitutes the insertion hole 74.

The materials of the first protective member 72 and the second protective member 73 each have a Vickers hardness higher than that of the valve main body 71, which is part of the valve member 70 other than the protective members 72, 73. The material of the valve main body 71 is ferritic stainless steel, and the materials of the first protective member 72 and the second protective member 73 are both austenitic stainless steel.

The positional relationship between the thermostat 50 and the water jacket WJ of the cylinder block CB will now be described.

Figure 3:
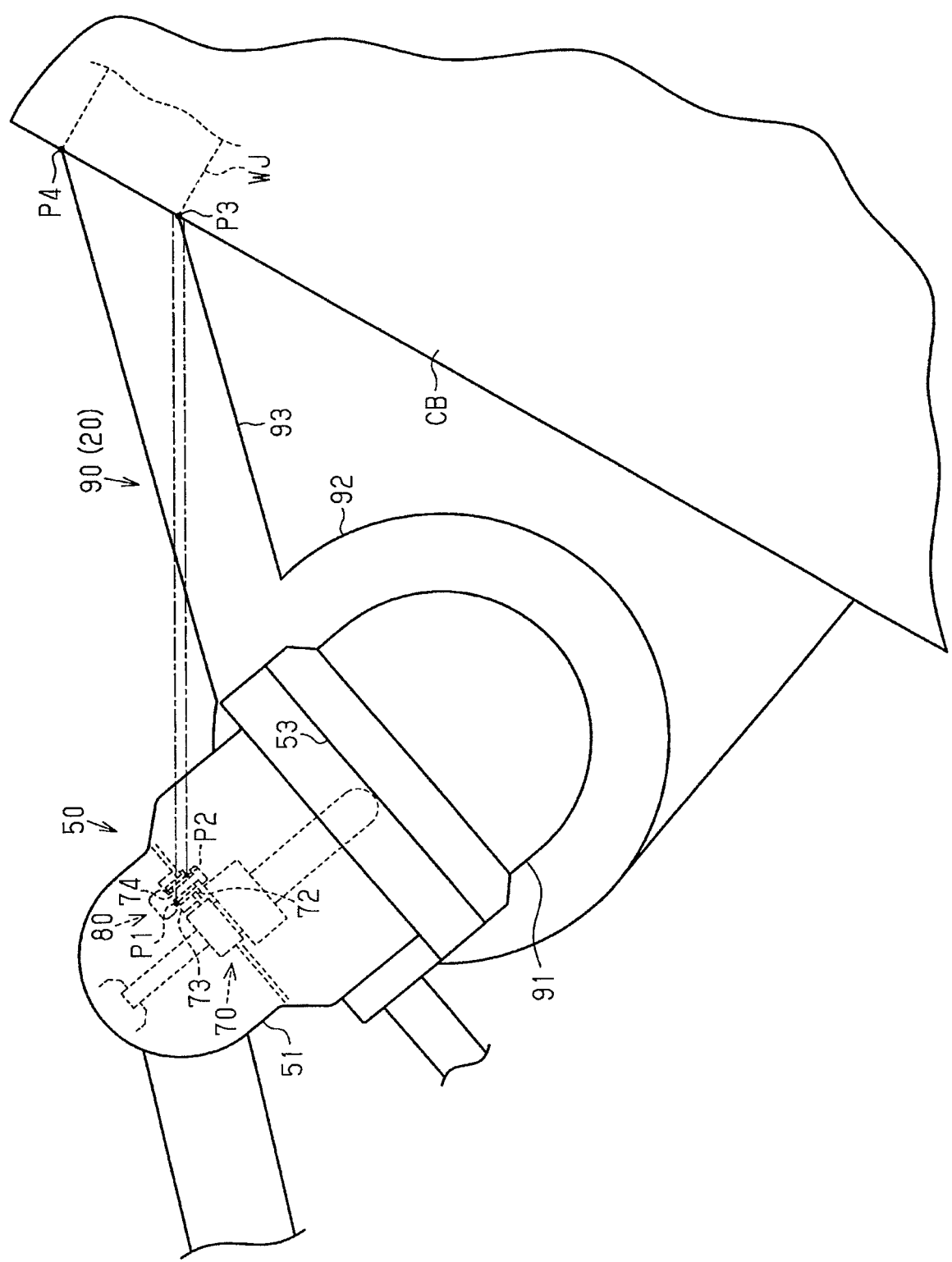
FIG. 3 is a side view showing a thermostat and a suction cover attached to an internal combustion engine.

As shown in FIG. 3, the internal combustion engine includes a cylinder block CB, in which cylinders are defined. When the internal combustion engine is mounted on a vehicle, the cylinder block CB is inclined.

A suction cover 90 is fixed to the side surface of the cylinder block CB. The suction cover 90 is generally divisible into a first suction cover member 91, a second suction cover member 92, and a third suction cover member 93.

The first suction cover member 91 is connected to the outflow port 53 of the thermostat 50. The first suction cover member 91 is dome-shaped. The first suction cover member 91 has an opening that is arranged to face the outflow port 53 of the thermostat 50.

The second suction cover member 92 is connected to the first suction cover member 91. The second suction cover member 92 is cylindrical. Although not illustrated, the second suction cover member 92 incorporates the impeller of the water pump 10. Thus, rotation of the impeller of the water pump 10 causes coolant to flow into the second suction cover member 92 from the first suction cover member 91, so that the coolant is pressure-fed from the second suction cover member 92.

A first end of the second suction cover member 92 is connected to a first end of the third suction cover member 93. The third suction cover member 93 is tubular. A second end of the third suction cover member 93 is connected to the water jacket WJ of the cylinder block CB. That is, the suction cover 90 is an introduction passage that connects the outflow port 53 of the thermostat 50 to the water jacket WJ of the cylinder block CB. The introduction passage constitutes a part of the coolant passage 20.

In a state in which the internal combustion engine is mounted on the vehicle, the space on the upstream side of the valve member 70 in the thermostat housing 51 is arranged above the space on the downstream side of the valve member 70 with the valve member 70 in between.

Also, in a state in which the internal combustion engine is mounted on the vehicle, the upper opening of the insertion hole 74 of the thermostat 50 is located above the second end of the third suction cover member 93, which is connected to the water jacket WJ.

Specifically, the lower end P1 in the upstream open edge of the insertion hole 74 is located above the lower end P3 in the open edge of the second end of the third suction cover member 93, which is connected to the water jacket WJ. Also, the lower end P1 is located below the upper end P4 in the open edge of the second end of the third suction cover member 93, which is connected to the water jacket WJ.

Further, in a state in which the internal combustion engine is mounted on the vehicle, the lower opening of the insertion hole 74 of the thermostat 50 is located below the second end of the third suction cover member 93, which is connected to the water jacket WJ.

Specifically, the upper end P2 in the downstream open edge of the insertion hole 74 is located below the lower end P3 in the open edge of the second end of the third suction cover member 93, which is connected to the water jacket WJ.

The operation and advantages of the present embodiment will now be described.

When the water pump 10 is driven, coolant flows through the coolant passage 20 and the bypass passage 40. In the coolant passage 20, the coolant flows into the thermostat housing 51 from the first inflow pipe 52. This increases the coolant pressure on the upstream side of the valve main body 71 in the thermostat housing 51. The coolant pressure pushes the head 82 of the jiggle valve 80 against the open edge of the insertion hole 74 in the valve member 70.

In the present embodiment, the upstream open edge of the insertion hole 74, at which the head 82 of the jiggle valve 80 and the valve member 70 contact each other, is constituted by the second protective member 73. The inner circumferential surface of the insertion hole 74, on which the shaft 81 of the jiggle valve 80 and the valve member 70 contact each other, is constituted by the first protective member 72 and the second protective member 73. Further, the downstream surface of the insertion hole 74, at which the retaining portion 83 of the jiggle valve 80 and the valve member 70 contact each other, is constituted by the first protective member 72. That is, the part of the valve member 70 that contacts the jiggle valve 80 is constituted by the first protective member 72 and the second protective member 73, which has a high Vickers hardness. Thus, the part of the valve member 70 that contacts the jiggle valve 80 resists wear even if the jiggle valve 80 moves slightly to repeatedly collide with or slide on the valve member 70.

In a coolant circulation system, the coolant is changed when the coolant has deteriorated by replacing deteriorated coolant with new coolant. When replacing coolant, new coolant is supplied to the upstream portion 51U of the thermostat housing 51 from the first inflow pipe 52 in a state in which the valve member 70 closes the flow path of the thermostat housing 51. The new coolant collects in the space defined by the upstream portion 51U and the valve member 70. When the level of the coolant collected in the space surpasses the lower end P1 in the upstream open edge of the insertion hole 74, the coolant that has flowed into the upstream portion 51U flows to the downstream portion 51D, which is located below the level of the coolant, via the insertion hole 74. The coolant that has flowed into the downstream portion 51D further flows out from the outflow port 53 to the first suction cover member 91, which is located below the outflow port 53. Further, the coolant that has flowed into the first suction cover member 91 collects in the first suction cover member 91, the second suction cover member 92, and the third suction cover member 93, and flows into the water jacket WJ of the cylinder block CB. As described above, in a state in which the internal combustion engine is mounted on the vehicle, the upper opening of the insertion hole 74 of the thermostat 50 is located above the second end of the third suction cover member 93, which is connected to the water jacket WJ. This allows the coolant to smoothly flow to the water jacket WJ due to the gravity.

In the present embodiment, in a state in which the internal combustion engine is mounted on the vehicle, the upper end P2 in the downstream open edge of the insertion hole 74 is located below the lower end P3 in the open edge of the second end of the third suction cover member 93. In this case, before reaching the lower end P3 in the open edge of the second end of the third suction cover member 93, the level of the coolant reaches the upper end P2 in the downstream open edge of the insertion hole 74. Even if the coolant flows into the insertion hole 74 and flows backward to a section on the upstream side of the valve member 70 in the thermostat housing 51, the coolant cannot be quickly supplied to the water jacket WJ.

However, in the present embodiment, in a state in which the internal combustion engine is mounted on the vehicle, the lower end P1 in the upstream open edge of the insertion hole 74 is located above the lower end P3 in the open edge of the second end of the third suction cover member 93, which is connected to the water jacket WJ. Thus, when coolant is collecting in the third suction cover member 93, the level of the coolant reaches the lower end P3 in the open edge of the second end of the third suction cover member 93 before reaching the lower end P1 in the upstream open edge of the insertion hole 74. As such, the coolant flows from the third suction cover member 93 into the water jacket WJ before flowing back to the section on the upstream side of the valve member 70 in the thermostat housing 51 via the insertion hole 74. The new coolant supplied from the first inflow pipe 52 thus smoothly flows to the water jacket WJ.

The lower end P1 in the upstream open edge of the insertion hole 74 is located above the lower end P3 in the open edge of the third suction cover member 93. In the present embodiment, this configuration is fabricated by a relatively simple structure in which the first protective member 72 and the second protective member 73 are caused to project upward with respect to the valve main body 71. This requires no change in the arrangement of the thermostat 50 in relation to the cylinder block CB or no major alteration in the shape of the thermostat housing 51. That is, the lower end P1 of the upstream open edge of the insertion hole 74 can be arranged above the lower end P3 of the third suction cover member 93 with a minimum change in the design of the thermostat 50 and the surrounding structure.

The above-described embodiment may be modified as follows. The above-described embodiment and the following modifications can be combined as long as the combined modifications remain technically consistent with each other.

The protective portion may be constituted by a single member or more than two members. For example, a tubular protective member may be inserted and fixed to the through-hole 79 of the valve main body 71.

The structure of the protective portions is not limited to the above-described embodiment. For example, part of the valve member 70 may be subjected to surface treatment or thermal treatment in order to form, on the valve member 70, a protective portion having a Vickers hardness higher than that of the remaining parts.

The inner circumferential surface of the insertion hole 74 of the valve member 70 does not need to be constituted by a protective portion. For example, an annular washer (protective portion) having a hardness higher than that of the valve main body 71 may be attached to a part on the upper surface (upstream surface) of the valve main body 71 that includes the open edge of the insertion hole. In this case, for example, if the outer diameter of the shaft 81 of the jiggle valve 80 is smaller than the inner diameter of the insertion hole, the shaft 81 is not likely to contact the inner circumferential surface of the insertion hole, so that the inner circumferential surface of the insertion hole is not likely to wear.

The downstream open edge of the insertion hole 74 in the valve member 70 does not need to be constituted by a protective portion. When an annular washer (protective portion) is attached only to the upper surface of the valve main body 71 as in the above-described modification, the downstream open edge of the insertion hole 74 in the valve member 70 is not constituted by a protective portion. Also, the coolant pressure in the part of the thermostat housing 51 on the downstream side of the valve member 70 is lower than that on the upstream side. Thus, the retaining portion 83 of the jiggle valve 80 is highly unlikely to be pressed against the lower surface of the valve main body 71 with great force. Therefore, excessive wear is unlikely to occur even if the downstream open edge of the insertion hole 74 of the valve member 70 is not constituted by a protective portion.

The structure of the introduction passage is not limited to that in the above-described embodiment. The structure of the introduction passage may be changed as long as the introduction passage has a first end connected to the outflow port 53 of the thermostat 50 and a second end connected to the water jacket WJ in the cylinder block CB. For example, the introduction passage may be constituted by a tubular member instead of the suction cover 90.

The shape of the jiggle valve 80 is not limited to that in the above-described embodiment. For example, the head 82 of the jiggle valve 80 may be plate-shaped, and the retaining portion 83 may be rod-shaped. The head 82 may have any shape as long as it can open and close the insertion hole 74. Also, the retaining portion 83 may have any shape as long as the jiggle valve 80 does not come off the insertion hole 74 to the upstream side.

The lower end P1 in the upstream open edge of the insertion hole 74 may be located above the upper end P4 in the open edge of the second end of the third suction cover member 93, which is connected to the water jacket WJ. The higher the lower end P1 of the insertion hole 74 in relation to the upper end P4 of the third suction cover member 93, the more readily new coolant flows into the water jacket WJ.

The lower end P1 in the upstream open edge of the insertion hole 74 may be located below the lower end P3 in the open edge of the second end of the third suction cover member 93. In this case, it may take longer to supply coolant than in the above-described embodiment.

The upper end P2 in the downstream open edge of the insertion hole 74 may be located above the lower end P3 in the open edge of the second end of the third suction cover member 93. Even in this case, since the first protective member 72 and the second protective member 73 are employed in the above-described embodiment, the lower end P1 in the upstream open edge of the insertion hole 74 is located on the upper side. Accordingly, coolant is quickly supplied to the water jacket WJ.

In addition to the bypass passage 40, a bypass passage may be provided that bypasses the radiator 30 and connects a section upstream of the radiator 30 to the second inflow pipe 60 of the thermostat 50. Also, a heat exchanger (heater core) may be provided in the middle of the bypass passage 40 in order to warm devices using the heat of the warmed coolant.

The water pump 10 may be a mechanical pump coupled to the crankshaft of the internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A thermostat provided in a middle of a coolant passage of a coolant circulation system employed in a vehicle, the thermostat comprising:
    a thermostat housing that constitutes a part of the coolant passage;
    a valve member that is arranged inside the thermostat housing and selectively opens and closes a flow path inside the thermostat housing; and
    a jiggle valve that is attached to an insertion hole extending through the valve member, wherein the jiggle valve includes
        a shaft that extends through the insertion hole, and
        a head that is coupled to an upstream side of the shaft and is capable of closing the insertion hole, and
    wherein the valve member includes
        a first protective member configured to contact a downstream surface of the valve member, the first protective member including a first open edge of the insertion hole,
        a second protective member configured to contact an upstream surface of the valve member, the second protective member including a second open edge of the insertion hole, and
        a valve main body other than the first and second protective members, and
        wherein materials of the first and second protective members each have a Vickers hardness higher than that of the valve main body.

2. The thermostat according to claim 1, wherein, in the valve member, an inner circumferential surface of the insertion hole is constituted by the first and second protective members.

3. The thermostat according to claim 1, wherein
    the jiggle valve includes a retaining portion that is coupled to a downstream side of the shaft and prevents the jiggle valve from coming off the insertion hole.

4. A coolant passage structure comprising:
    a thermostat provided in a middle of a coolant passage of an internal combustion engine; and
    an introduction passage that is connected to a downstream end of the thermostat and constitutes a part of the coolant passage, wherein the thermostat includes
        a thermostat housing that constitutes a part of the coolant passage, a valve member that is arranged inside the thermostat housing and selectively opens and closes a flow path of the thermostat housing, and a jiggle valve that is attached to an insertion hole extending through the valve member, the jiggle valve includes a shaft that extends through the insertion hole, and a head that is coupled to an upstream side of the shaft and is capable of closing the insertion hole, wherein the valve member includes a first protective member configured to contact a downstream surface of the valve member, the first protective member including a first open edge of the insertion hole, a second protective member configured to contact an upstream surface of the valve member, the second protective member including a second open edge of the insertion hole, and a valve main body other than the first and second protective members, wherein materials of the first and second protective members each have a Vickers hardness higher than that of the valve main body, wherein the introduction passage is connected to a water jacket of a cylinder block in the internal combustion engine, wherein in a state in which the internal combustion engine is mounted on a vehicle, a space on an upstream side of the valve member in the thermostat housing is arranged above a space on a downstream side of the valve member with the valve member in between, and wherein an upper opening of the insertion hole is located above a section at which the introduction passage is connected to the water jacket of the cylinder block.

5. The coolant passage structure according to claim 4, wherein a lower opening of the insertion hole is located below the section at which the introduction passage is connected to the water jacket of the cylinder block, and the first protective member projects upward with respect to a section of the valve member other than the first protective member.

\* \* \* \* \*